Patented Sept. 5, 1933

1,925,688

UNITED STATES PATENT OFFICE 1,925,688

PROCESS OF REFINING NONFERROUS ALLOYS

Ralph F. Cohn, Dixon, Ill.

No Drawing. Application April 16, 1931
Serial No. 530,726

10 Claims. (Cl. 75—15)

This invention relates to the refining of non-ferrous metals and has particular reference to a process for treating impure lead to remove the impurities in the form of drosses relatively high in desired impurities.

When non-ferrous metals are treated by the Kroll process, which involves the treatment of the impure metals and alloys with an alkali-earth metal, an alkali metal, a rare earth metal, or combinations of these metals, a dross is formed containing arsenic, antimony, copper, gold, bismuth, and other alloying elements.

My invention contemplates the production of drosses richer in one or more of the impurities and freer from other impurities than is the case under the Kroll process. The principal aims of the present invention are (1) more economical use of the reagent, (2) reduction in the quantity of dross formed giving a higher concentration of each impurity, (3) substitution of several small drosses for the single dross, each of the smaller drosses containing a relatively large amount of one or more impurities and very small amounts of the other impurities present in the original impure material treated, and (4) the reuse of the smaller drosses for the treatment of subsequent batches of impure metal whereby the drosses are concentrated and the addition of the reagent to the impure metal is facilitated.

In a general way the invention consists in the removal of a series of impurities from an impure non-ferrous metal by the use of an alkali-forming metal, in the form of a series of drosses, each dross being relatively rich in a certain impurity. The order of removal of these impurities is the same as the order of their reactivity with the reagent, the most reactive impurity being the first to be removed etc. The order will vary somewhat due to the relative concentrations of the various impurities in the impure metal. In the case of lead, it is arsenic, antimony, copper, silver, gold, zinc and bismuth. The invention further contemplates the reuse of these drosses on subsequent quantities of impure metal as the treating agent, in a predetermined order, certain drosses being removed from the process when they have obtained desired concentrations of certain impurities.

The usual method for treating lead containing antimony and bismuth is to dissolve the reagent in the molten lead, mix the reagent with the lead and skim off the resulting dross. This dross contains considerable antimony and a portion of the bismuth and is rich in the reagent added. The lead is then cooled to a point slightly above its melting point or above 621° F. and a second dross is skimmed off. This dross is very high in lead, due to working so close to the freezing point of the lead, and is also very low in the reagent aded. It does, however, contain an appreciable amount of bismuth and is, therefore, ordinarily thrown onto the next ketttle to be treated, since it is too low in impurities to be given the treatmen applied to drosses rich in impurities. This dross is termed a finishing dross. Thus the usual process produces a rich dross and a relatively lean finishing dross.

Assuming, for the sake of simplicity, that an impure lead containing only antimony and bismuth is to be treated, according to my process I add to the impure lead at a temperature of about 660° F. or above, for example, at 800° F., slightly less of the reagent than required to react with the antimony. When the reagent is thoroughly incorporated in the lead I would skim a dross. This dross would be relatively rich in antimony and contain a little bismuth. I then add additional reagent, in greater quantity than required to react with the remaining impurities and skim off a second dross. This dross contains the residual antimony and the greater portion of the bismuth. I then cool the lead and take off a finishing dross at about 621° F. Thus I obtain an antimony dross, a bismuth dross, and a finishing dross.

I add the antimony dross obtained from the previous kettle to the next kettle of molten impure lead to be treated, employing this dross as a reagent. When this antimony dross is added to the second kettle most of the small amount of bismuth which it held is released to the impure lead, and additional antimony from the second kettle is substituted therefor. This gives a dross very rich in antimony having only about the same percentage of bismuth as the impure lead under treatment. This so-called super-antimony dross contains two to three times as large a percentage of antimony as the dross obtained by the Kroll process. This super-antimony dross is removed from the process for subsequent treatment to recover the metals. The second kettle being treated will, at this point, still contain some antimony. The bismuth dross from the first kettle is next used as a reagent for the treatment of the second kettle. The residual antimony in the second kettle replaces most of the bismuth in the dross and the new dross formed is essentially an antimony dross containing a considerable amount of bismuth. This dross is skimmed off and used as the first reagent in the treatment of a third kettle, where the bismuth is replaced by antimony and a super-antimony dross formed. The lead in the second kettle is now free from antimony and higher in bismuth than the original impure lead. The finishing dross from the first kettle is now added to the second kettle and a quantity of the reagent metal or alloy also added, whereupon a third dross may be skimmed off. This removes most of the bismuth from the lead in the second kettle, producing a super-bismuth dross. This super-dross is removed from the process for other forms of treatment. A quantity of reagent greater in amount than required to react with the remainder of the bismuth is added to the lead and a bismuth dross is skimmed off. This dross contains considerable bismuth and is employed as the reagent in the second step in the treatment of a third kettle, the result of such treatment being to produce the antimony dross from that kettle. The lead in the second kettle is then cooled to about 621° F., whereupon a finishing dross is skimmed off. This finishing dross is added to the third kettle after the antimony has been removed from the lead in that kettle.

Each of the super-drosses is a dross substantially saturated with respect to a particular impurity. Any unsaturated dross is used over again on a subsequent kettle to enrich it further. When treating lead containing small fractions of an impurity, a single dross may be skimmed from the first and also from the second kettle and the dross from the first kettle employed as an antimony dross, while the dross from the second kettle is employed as a bismuth dross to build up the concentration of the individual impurities in separate drosses. One of the objects of the process is the formation of a "super-dross" which is near the saturation point with respect to a certain impurity.

When only one impurity is present in more than insignificant amounts in the metal to be treated, and that impurity occurs in low percentages, the drosses from several kettles may be combined to serve as a reagent for a subsequent kettle. For example, if several kettles of lead containing 0.1% Bi, are treated, the drosses so formed may contain less than 1% Bi, and may be combined to treat a subsequent kettle, thereby yielding a dross containing between 1% and 2% Bi, and reducing the quantity of dross which must be treated to remove the bismuth.

Another advantage of the process is that the additions of pure reagent such, for example, as calcium, is made to the impure metal only after the antimony and other highly reactive impurities have been removed from the molten metal, the advantage of which is clearly shown and discussed in my copending application Serial No. 530,725, filed April 16, 1931. In other words, subsequent to the first kettle the arsenic, antimony, etc., are removed through the addition of drosses obtained from the first kettle, thereby eliminating the necessity of treating subsequent kettles with the unalloyed reagent metal for the purpose of removing these impurities.

When the impure alloy contains one principal impurity and a number of less important ones, separate super-drosses need not be formed for each of the impurities, but one combination super-dross may be saturated with one impurity and also be high in other unimportant impurities. For instance, in treating impure lead containing arsenic, antimony, and bismuth, only two types of super-drosses need be taken, the first containing antimony, and arsenic, which are impurities reacting more readily than bismuth, and the second dross containing primarily bismuth.

While I have described the process as applied to the treatment of lead it will be clear that the process is equally applicable to the refinement of other types of metals with the use of other similar reagents. The process is generally applicable to the treatment of non-ferrous metals and alloys with alkali-forming metals or alloys of the same. By alkali-forming metals I mean metals of the alkali metal, rare earth metal and alkali earth metal groups and in addition thereto the metal magnesium, and aluminum.

While I have thus described a specific embodiment of my invention I am aware that numerous alterations and changes may be made therein without materially departing from the spirit of the invention and the scope of the appended claims in which—

I claim:

1. The method of selectively separating and recovering metallic impurities from impure lead which comprises, treating the lead in succession with droses resulting from the previous treatment of impure lead with alkali-forming metals to progressively build up the concentration of a single impurity in each dross.

2. The method of selectively separating and recovering metallic impurities from impure lead which comprises, treating a body of molten lead with successive quantities of an alkali-forming metal sufficient to combine with desired impurities, removing the dross after each addition of said alkali-forming metal, and treating successive bodies of molten lead with said drosses in the order of their removal to concentrate and segregate a single impurity in each dross.

3. The method of selectively separating and recovering metallic impurities from impure lead which comprises, treating a body of molten lead with successive quantities of a metallic calcium reagent sufficient to combine with desired impurities, removing the dross after each addition of said calcium reagent, and treating successive bodies of molten lead with said drosses in the order of their removal to concentrate and segregate a single impurity in each dross.

4. The method of selectively separating and recovering metallic impurities from impure lead which comprises adding successive quantities of a calcium reagent to molten lead to produce a series of drosses each relatively rich in one or more of the impurities, treating subsequent quantities of lead with said drosses in the order of their removal to selectively remove said impurities as drosses each high in a particular impurity and obtain maximum efficiency from the calcium reagent.

5. The method of selectively separating and recovering metallic impurities from lead alloys which comprises, treating a body of molten alloy with successive quantities of an alkali-forming metal sufficient to combine with desired impurities, removing the dross after each addition of said alkali-forming metal, treating successive bodies of molten alloy with said drosses in the order of their removal to concentrate and segregate a single impurity in each dross, and removing each dross from the system when it has reached a predetermined composition.

6. The method of selectively separating and recovering metallic impurities from impure lead which comprises, treating a body of molten lead with successive quantities of a metallic calcium containing reagents sufficient to combine with desired impurities, removing the dross after each addition of said metallic calcium containing reagent, treating successive bodies of molten lead with said drosses in the order of their removal to concentrate and segregate a single impurity in each dross, and removing each dross from the system when it has reached a predetermined composition.

7. The method of selectively separating and recovering metallic impurities from impure lead containing at least two impurities which includes treating impure lead with a dross resulting from a previous treatment of such lead with an alkali-forming metal, in quantity about sufficient to combine with the more reactive impurity, whereby the less reactive impurity in the dross is replaced by the more reactive impurity from the lead to produce a dross having a greater concentration of a desired impurity, and removing the latter dross from the lead.

8. The method of selectively separating and recovering metallic impurities from impure lead containing at least two impurities of different reactivities, which includes, treating the molten lead with a reagent containing an alkali-forming metal and capable of forming a dross containing the impurities, treating a second quantity of said molten lead with the dross so formed in quantity about sufficient to combine with the more reactive impurity, whereby the less reactive impurity in the dross is replaced by the more reactive impurity from the lead and the less reactive impurity is deposited in the lead to produce a dross having a greater concentration of a desired impurity, and removing the latter dross from the lead.

9. The method of selectively separating and recovering metallic impurities from impure lead containing a series of impurities of different reactivities which includes, treating the molten lead with successive quantities of a reagent including an alkali-forming metal capable of forming a dross with said impurities the successive quantities of reagent each being about sufficient to combine with the most reactive impurity remaining in the lead, removing the dross from the lead after each addition of reagent, treating subsequent quantities of impure lead with the drosses from prior quantities in the order of their removal from the lead, whereby the less reactive impurities in the dross are replaced by the more reactive impurity from the lead to produce drosses having greater concentrations of desired impurities, and removing each dross from the system when it has reached a predetermined composition.

10. The method of selectively separating and recovering metallic impurities from impure lead containing a series of impurities of different reactivities which consists, in removing the more reactive of the impurities through the addition in the order of their formation of drosses resulting from the treatment of prior quantities of impure lead with alkali-forming metals and the remainder of the impurities through the addition of an alkali-forming metal.

RALPH F. COHN.